United States Patent
Lavid Ben Lulu et al.

(10) Patent No.: US 11,669,083 B2
(45) Date of Patent: Jun. 6, 2023

(54) SYSTEM AND METHOD FOR PROACTIVE REPAIR OF SUB OPTIMAL OPERATION OF A MACHINE

(71) Applicant: Presenso, Ltd., Haifa (IL)

(72) Inventors: David Lavid Ben Lulu, Nesher (IL); Waseem Ghrayeb, Nazareth Illit (IL)

(73) Assignee: AKTIEBOLAGET SKF, Gothenburg (SE)

( * ) Notice: Subject to any disclaimer, the term of this patent is extended or adjusted under 35 U.S.C. 154(b) by 584 days.

(21) Appl. No.: 16/696,239

(22) Filed: Nov. 26, 2019

(65) Prior Publication Data
US 2020/0166921 A1 May 28, 2020

Related U.S. Application Data

(60) Provisional application No. 62/771,600, filed on Nov. 27, 2018.

(51) Int. Cl.
*G05B 23/02* (2006.01)
*G06Q 10/00* (2012.01)
*G06Q 10/20* (2023.01)

(52) U.S. Cl.
CPC ..... *G05B 23/0283* (2013.01); *G05B 23/0275* (2013.01); *G05B 23/0294* (2013.01); *G06Q 10/20* (2013.01)

(58) Field of Classification Search
CPC .............. G05B 23/024; G05B 23/0275; G05B 23/0283; G05B 23/0294; G06N 20/00; G06Q 10/20
See application file for complete search history.

(56) References Cited

U.S. PATENT DOCUMENTS

| | | |
|---|---|---|
| 6,983,210 B2 | 1/2006 | Matsubayashi et al. |
| 6,993,417 B2 | 1/2006 | Osann |
| 7,276,915 B1 | 10/2007 | Euler et al. |
| 7,317,404 B2 | 1/2008 | Cumeralto et al. |
| 7,346,433 B2 | 3/2008 | Budike |
| 7,423,546 B1 | 9/2008 | Aisa |
| 7,451,017 B2 | 11/2008 | McNally |
| 7,460,930 B1 | 12/2008 | Howell et al. |
| 7,463,986 B2 | 12/2008 | Hayes |
| 7,605,698 B2 | 10/2009 | Moriwaki |

(Continued)

FOREIGN PATENT DOCUMENTS

WO WO-2017116627 A1 * 7/2017 ........... G05B 19/418

*Primary Examiner* — Michael J Dalbo
(74) *Attorney, Agent, or Firm* — M&B IP Analysts, LLC

(57) ABSTRACT

A system and computer-implemented method for identifying and repairing suboptimal operation of a machine, the computer-implemented method including: monitoring sensory input data related to an industrial machine; analyzing, using an unsupervised machine learning model, the monitored sensory inputs, wherein the output of the unsupervised machine learning model includes at least one indicator; identifying, based on the at least one indicator, at least one behavioral pattern related to the industrial machine, wherein each of the at least one behavioral pattern is indicative of at least one suboptimal operation of the industrial machine; selecting at least one corrective action based on the at least one behavioral pattern; and performing the at least one corrective action on the industrial machine.

19 Claims, 6 Drawing Sheets

(56) References Cited

U.S. PATENT DOCUMENTS

| | | |
|---|---|---|
| 7,840,383 B2 | 11/2010 | Wang |
| 7,865,333 B2 | 1/2011 | Becker |
| 7,941,306 B2 | 5/2011 | Furem et al. |
| 8,255,090 B2 | 8/2012 | Frader-Thompson et al. |
| 8,306,797 B2 | 11/2012 | Furem et al. |
| 8,468,380 B2 | 6/2013 | Munjal et al. |
| 8,644,166 B2 | 2/2014 | Xia et al. |
| 8,649,987 B2 | 2/2014 | Steenberg et al. |
| 9,476,803 B2 | 10/2016 | Al-Najjar |
| 2004/0088601 A1* | 5/2004 | Shah ............... G05B 23/0224 714/E11.144 |
| 2004/0167686 A1* | 8/2004 | Baker .................. B61L 5/06 701/19 |
| 2008/0082345 A1 | 4/2008 | Greiner et al. |
| 2011/0035338 A1 | 2/2011 | Kagan et al. |
| 2016/0069778 A1 | 3/2016 | Sahu |
| 2016/0308485 A1 | 10/2016 | Wilson et al. |
| 2016/0314627 A1* | 10/2016 | Fish .................. G07C 5/0808 |
| 2017/0316125 A1 | 11/2017 | Jacobson et al. |

\* cited by examiner

SYSTEM AND METHOD FOR PROACTIVE REPAIR OF SUB OPTIMAL OPERATION OF A MACHINE

CROSS-REFERENCE TO RELATED APPLICATIONS

This application claims the benefit of U.S. Provisional Application No. 62/771,600 filed on Nov. 27, 2018, the contents of which are hereby incorporated by reference.

TECHNICAL FIELD

The present disclosure relates generally to maintenance systems for machines, and more specifically to monitoring machine operations and proactively repairing failures and suboptimal operations of machines.

BACKGROUND

Communications, processing, cloud computing, artificial intelligence, and other computerized technologies have advanced significantly in recent years, heralding in new fields of technology and production. Notwithstanding these improvements, many of the industrial technologies employed since or before the 1970s remain in use today. Existing solutions related to these industrial technologies have typically seen minor improvements, thereby increasing production and yield only slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs, when a machine deviates from correct service. Errors, which are typically deviations from the correct state of the machine, are not necessarily failures, but may lead to and indicate potential future failures. Aside from failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450-megawatt power turbine, for example, a single day of downtime can cost a manufacturer over $3 million US in lost revenue. Such downtime may incur additional costs related to repair, safety precautions, and the like.

In energy power plants, billions of US dollars are spent annually on ensuring reliability. Specifically, billions of dollars are spent on backup systems and redundancies to minimize production downtimes. Additionally, monitoring systems may be used to identify failures quickly, thereby speeding up a return to production when downtime occurs. However, existing monitoring systems typically identify failures only after, during, or immediately before downtime begins.

Further, existing solutions for monitoring machine failures typically rely on a set of predetermined rules for each machine. These rule sets do not account for all data that may be collected with respect to the machine, and may only be used for checking particular key parameters while ignoring the rest. Moreover, these rule sets are configured in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination of failures.

Additionally, existing solutions often rely on periodic testing at predetermined intervals. Thus, even existing solutions that can predict failures in advance typically return requests to perform machine maintenance even when the machine is not in immediate danger of failing. Such premature replacement results in wasted materials and expenses spent replacing parts that are still functioning properly. Further, such existing solutions often determine failures only after a failure occurs. As a result, such failures may not be prevented, resulting in downtime and lost revenue.

Furthermore, existing monitoring and maintenance solutions often require dedicated testing equipment. Consequently, these solutions typically require specialized operators who are well-trained in the operation of each monitoring and maintenance system. Requiring specialized operators can be inconvenient and costly and may introduce potential sources of human error. Given the sheer amount of data that may be collected for any given machine in addition to minute fluctuations in data, a human analyst is often not capable of adequately determining upcoming failures.

Lastly, existing solutions present techniques by which anomalies are identified and corrective solution recommendations are generated and provided. The corrective solution recommendations are usually sent to a user device associated with a user responsible for maintaining the machine. Therefore, although the process of identifying a suboptimal operation of a machine may be performed automatically, repairing an identified suboptimal operation of a machine is still performed manually. This is inefficient, time-consuming, and labor-intensive.

Additionally, selecting the most suitable corrective action, from a variety of possible actions, can be a challenge. Basing such a decision on an identified pattern that may indicate an upcoming machine failure leaves no place for human error, saving precious time when deciding which solution would be best for a particular pattern that is associated with a particular failure. Currently, even when such predictions of upcoming machine failures are available, there is no solution that suggests selecting a corrective solution based on a specific identified pattern.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a computer-implemented method for identifying and repairing suboptimal operation of a machine, the computer-implemented method including: monitoring sensory input data related to an industrial machine; analyzing, using an unsupervised machine learning model, the monitored sensory inputs, wherein the output of the unsupervised machine learning model includes at least one indicator; identifying, based on the at least one indicator, at least one behavioral pattern related to the industrial machine, wherein each of the at least one behavioral pattern is indicative of at least one suboptimal operation of the industrial machine; selecting at least one corrective action based on the at least one behavioral pattern; and performing the at least one corrective action on the industrial machine.

Certain embodiments disclosed herein also include a non-transitory computer readable medium having stored thereon instructions for causing a processing circuitry to perform a process, the process including: monitoring sensory input data related to an industrial machine; analyzing, using an unsupervised machine learning model, the monitored sensory inputs, wherein the output of the unsupervised machine learning model includes at least one indicator; identifying, based on the at least one indicator, at least one behavioral pattern related to the industrial machine, wherein each of the at least one behavioral pattern is indicative of at least one suboptimal operation of the industrial machine; selecting at least one corrective action based on the at least one behavioral pattern; and performing the at least one corrective action on the industrial machine.

Certain embodiments disclosed herein also include a system for identifying and repairing suboptimal operation of a machine, including: a processing circuitry; and a memory, the memory containing instructions that, when executed by the processing circuitry, configure the system to: monitor sensory input data related to an industrial machine; analyze, using an unsupervised machine learning model, the monitored sensory inputs, wherein the output of the unsupervised machine learning model includes at least one indicator; identify, based on the at least one indicator, at least one behavioral pattern related to the industrial machine, wherein each of the at least one behavioral pattern is indicative of at least one suboptimal operation of the industrial machine; select at least one corrective action based on the at least one behavioral pattern; and perform the at least one corrective action on the industrial machine.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
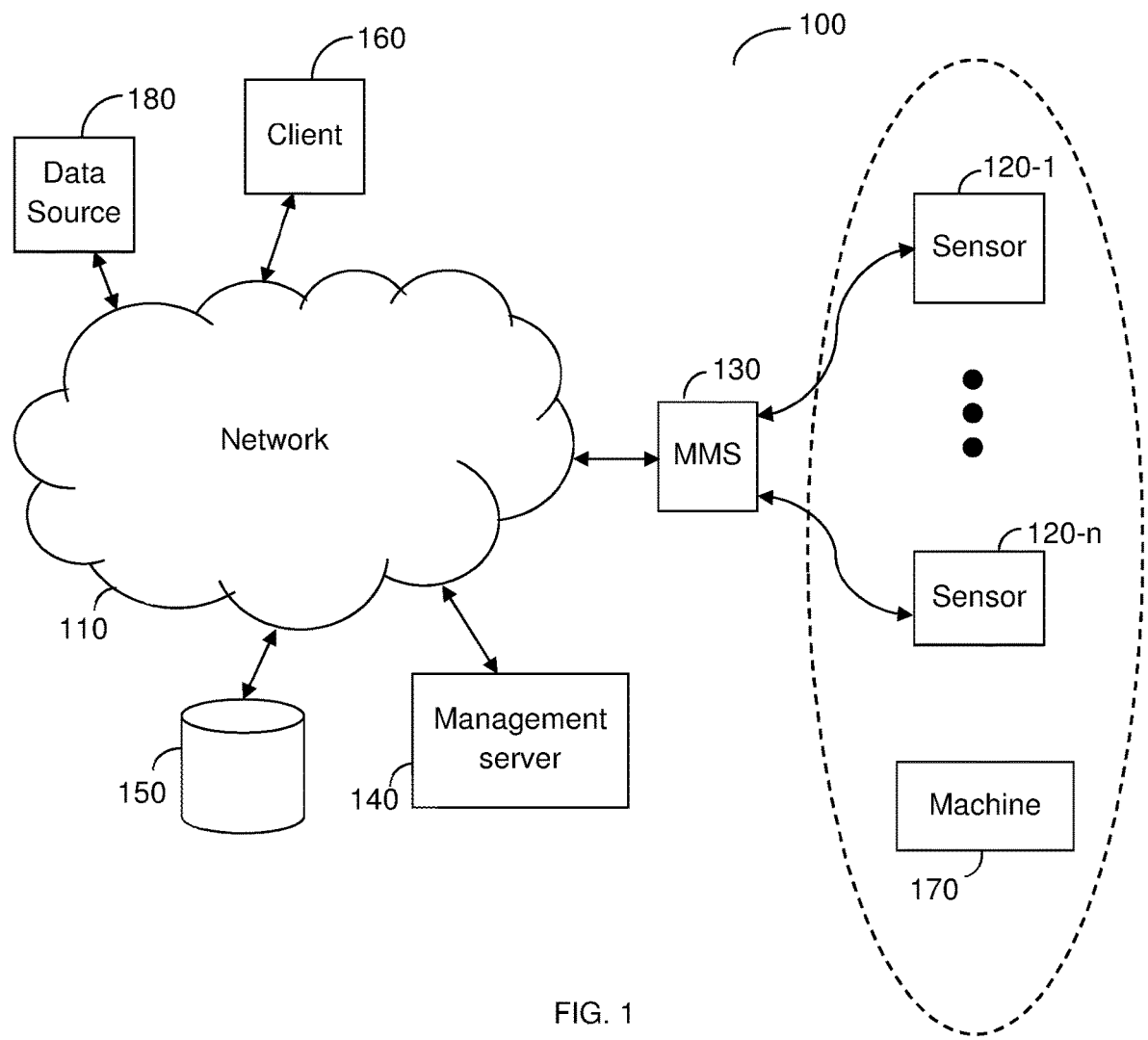
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By monitoring and analyzing sensory input data related to at least one machine, one or more patterns that may be indicative of a suboptimal operation of a machine, e.g., an industrial machine, are identified. The disclosed method further allows to automatically and proactively select and perform corrective actions based on the identified pattern. The corrective actions may include tuning the machine software parameters, i.e., configuration, change machine process conditions (temperature, humidity, and the like), inventory scheduling (order boiler/pump replacement a week before failure, and the like).

FIG. 1 is an example network diagram 100 utilized to describe the various disclosed embodiments. The example network diagram 100 includes a machine monitoring system (MMS) 130, a management server 140, a database 150, a client device 160, and a data source 180 connected through a network 110. The example network diagram 100 further includes a plurality of sensors 120-1 through 120-$n$ (hereinafter referred to individually as a sensor 120 and collectively as sensors 120, merely for simplicity purposes, where n is an integer equal to or greater than 1), connected to the MMS 130. The network 110 may be, but is not limited to, a wireless, a cellular or wired network, a local area network (LAN), a wide area network (WAN), a metro area network (MAN), the Internet, the worldwide web (WWW), similar networks, and any combination thereof.

The client device 160 may be, but is not limited to, a personal computer, a laptop, a tablet computer, a smartphone, a wearable computing device, or any other device capable of receiving and displaying notifications indicating maintenance and failure timing predictions, corrective solution recommendations, results of supervised analysis, unsupervised analysis of machine operation data, or both, and the like.

The sensors 120 are located in proximity (e.g., physical proximity) to a machine 170. The machine 170 may be any machine for which performance can be represented via sensory data such as, but not limited to, a turbine, an engine, a welding machine, a three-dimensional (3D) printer, an injection molding machine, a combination thereof, a portion thereof, and the like. Each sensor 120 is configured to collect sensory input data such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be connected communicatively or otherwise to the machine 170 (such connection is not illustrated in FIG. 1 merely for the sake of simplicity and without limitation on the disclosed embodiments). It should be noted that multiple machines, such as the machine 170, may be connected via the network 110 to the management server 140.

The data source 180 may be a server, a data warehouse, a website, a cloud database, and the like. The data source 180 may be configured to store one or more corrective solution recommendations or data associated with corrective actions that were utilized to solve or mitigate machine failures that previously occurred.

The sensors 120 are connected to the MMS 130. In an embodiment, the MMS 130 is configured to store and preprocess raw sensory input data received from the sensors 120. Alternatively, or collectively, the MMS 130 may be configured to periodically retrieve collected sensory input data stored in, for example, the database 150. The preprocessing may include, but is not limited to, data cleansing, normalization, rescaling, re-trending, reformatting, noise filtering, a combination thereof, and the like.

The preprocessing may further include feature extraction. In an embodiment, the results of the feature extraction include features to be utilized by the management server 140 during unsupervised machine learning in order to detect indicators. The feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in a lower dimensional space for the sensory input data. The machine monitoring system 130 is configured to send the preprocessed sensory input data to the management server 140.

In an embodiment, the management server 140 is configured to receive, through the network 110, the preprocessed sensory input data associated with the machine 170 from the machine monitoring system 130. The sensory input data may be received continuously and may be received in real-time. In an embodiment, the management server 140 is configured to store the sensory input data received from the machine monitoring system 130. Alternatively, or collectively, the sensory input data may be stored in the database 150. The database 150 may further store sensory input data (raw, preprocessed, or both) collected from a plurality of other sensors (not shown) associated with other machines (also not shown). The database 150 may further store indicators, anomalous patterns, failure predictions, behavioral models utilized for analyzing sensory input data, or a combination thereof.

The management server 140, typically comprising at least a processing circuitry (not shown) and a memory (not shown), the memory contains therein instructions that when executed by the processing circuitry configure the management server 140 as further described herein below.

In an embodiment, the management server 140 is configured to monitor the sensory input data related to at least one machine, e.g., the machine 170. The monitoring process may include, for example, tracking and aggregating a plurality of parameters associated with the sensory input data that are related to several machine components. The monitoring may be performed constantly and may further be performed by the machine monitoring system 130.

In an embodiment, the management server 140 is configured to analyze the preprocessed sensory input data. The analysis may include, but is not limited to, unsupervised machine learning. In a further embodiment, the unsupervised machine learning may include one or more signal processing techniques, implementation of one or more neural networks, or both. It should be noted that different parameters represented by the sensory input data may be analyzed using different machine learning techniques. For example, a temperature parameter may be analyzed by applying a first machine learning technique to sensory input data from a temperature sensor, and an energy consumption parameter may be analyzed by applying a second machine learning technique to sensory input data from an energy consumption gauge.

In an embodiment, the management server 140 is configured to automatically select a model that optimally indicates anomalies in the sensory input data based on, e.g., a type of one or more portions of the data. In a further embodiment, the selection may be based on results from applying a plurality of models to each of at least a portion of the sensory input data. In yet a further embodiment, the selection may be based further on false positive and true positive rates.

In a further embodiment, the management server 140 is configured to generate a meta-model based on at least one portion of the machine 170. Each portion of the machine for which a meta-model is generated may be a component (not shown) such as, but not limited to, a pipe, an engine, a portion of an engine, a combination thereof, and the like. Generating a meta-model may include, but is not limited to, selecting a model that optimally indicates anomalies in the sensory input data for each of the at least one portion of the machine 170. Each of the generated meta-models is utilized to detect anomalies in the behavior of the respective portion of the machine 170.

In an embodiment, the management server 140 is configured to generate, in real-time, at least one adaptive threshold for detecting anomalies based on the analysis. In a further embodiment, the management server 140 is configured to determine, in real-time or near real-time, normal machine behavioral patterns based on the sensory input data of the machine 170 or each portion thereof.

In an embodiment, upon identifying normal machine behavioral patterns, the management server 140 is configured to identify at least one machine behavioral pattern that is indicative of at least a suboptimal operation of the machine 170. A suboptimal operation may include a degradation in a machine production, poor machine productive, poor functioning with regard to normal functioning, machine fault, machine failure, and the like.

It should be noted that the machine behavioral patterns may be detected using the at least one adaptive threshold. The adaptive thresholds may be generated based on the determined normal behavior patterns. Generation of adaptive thresholds for detecting anomalies based on normal behavior patterns is described further herein below with respect to FIGS. 3A and 3B. In an embodiment, the management server 140 may be configured to determine based on the at least one machine behavioral pattern and the monitored sensory input data, at least one machine failure prediction. The at least one machine failure prediction may be a prediction of failure of the machine or of any portion thereof (e.g., a component of the machine). In an embodiment, the failures are predicted based on similar patterns of, e.g., anomalies.

In an embodiment, based on the identified machine behavioral pattern that is indicative of a suboptimal operation of the machine, the management server 140 is configured to select one or more corrective actions, e.g., from the data source 180, in order to automatically and proactively repair the suboptimal operation of the machine. In an embodiment, the proactivity of the management server 140 allows to repair and solve suboptimal operation of a machine, e.g., a machine fault, before the fault is developed into a machine failure. In a further embodiment, the management server 140 may be configured to generate a notification indicating anomalous activity, an upcoming machine failure that was recognized, a machine fault, a selected corrective action, and so on. In a further embodiment, the management server 140 is further configured to send the generated notification to, e.g., the user device 160. The selection process is described further in herein below with respect of FIG. 5.

In an embodiment, the management server 140 may be configured to proactively perform the selected at least one corrective action. Performing the selected corrective action may include for example, tuning the machine software parameters, i.e., configuration, change machine process conditions (temperature, humidity, and the like), inventory scheduling (order boiler/pump replacement a week before failure, and the like).

It should be noted that the machine monitoring system 130 is shown in FIG. 1 as a separate component from the management server 140 merely for simplicity purposes and without limitation on the disclosed embodiments. The machine monitoring system 130 may be incorporated in the management server 140, so as to allow the management server 140 to obtain and preprocess sensory input data without departing from the scope of the disclosure.

It should also be noted that the embodiments described herein above with respect to FIG. 1 are discussed with respect to a user device 160 and a machine 170 merely for simplicity purposes and without limitation on the disclosed embodiments. Multiple user devices may receive information related to machine maintenance and failures without departing from the scope of the disclosure. Additionally, sensory input data related to multiple machines may be collected to determine failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the management server 140 may reside in the cloud computing platform, a datacenter, on premise, and the like. Moreover, in an embodiment, there may be a plurality of management servers operating as described hereinabove and configured to either have one as a standby proxy to take control in a case of failure, to share the load between them, or to split the functions between them.

Figure 2:
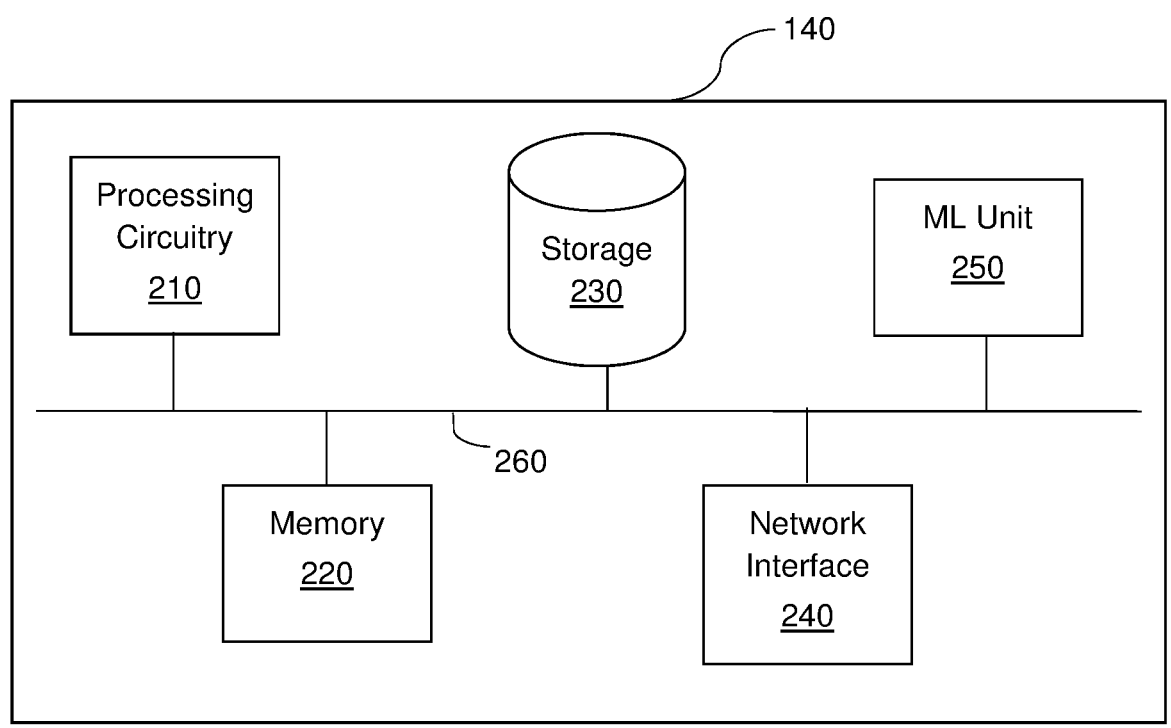
FIG. 2 is a block diagram of a management server according to an embodiment.

FIG. 2 shows an example block diagram of the management server 140 implemented according to one embodiment. The management server 140 includes a processing circuitry 210 coupled to a memory 220, a storage 230, a network interface 240, and a machine learning (ML) engine 250. In an embodiment, the components of the management server 140 may be connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, and the like), non-volatile (e.g., ROM, flash memory, and the like), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. In an embodiment, the memory 220 may contain data collected by the sensors, e.g., the sensors 120 of FIG. 1. In a further embodiment, such data may also be stored in a data warehouse such as the database.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the management server 140 to communicate with the machine monitoring system 130 for the purpose of, for example, receiving raw and/or preprocessed sensory input data. Additionally, the network interface 240 allows the management server 140 to communicate with the client device 160 in order to send, e.g., notifications related to anomalous activity, machine suboptimal operation, machine failure prediction, corrective solution recommendations, corrective actions, and the like.

The machine learning engine 250 is configured to perform machine learning based on sensory input data received via the network interface 240 as described further herein. In an embodiment, the machine learning engine 250 is further configured to determine, based on one or more machine learning models, suboptimal operation of a machine, machine failures, predictions for machine failures, and the like of the machine 170. In a further embodiment, the machine learning engine 250 is also configured to determine at least one corrective action for repairing the suboptimal operation of the machine. As a non-limiting example, the at least corrective action may include tuning the machine software parameters, i.e., configuration, change machine process conditions (temperature, humidity, and the like), inventory scheduling (order boiler/pump replacement a week before failure, and the like). The learning engine 250 may be realized as a graphics processing unit (GPU), a tensor processing unit (TPU), and the like.

It should be understood that the embodiments described herein are not limited to the specific architecture illustrated in FIG. 2, and other architectures may be equally used without departing from the scope of the disclosed embodiments.

Figure 3A:
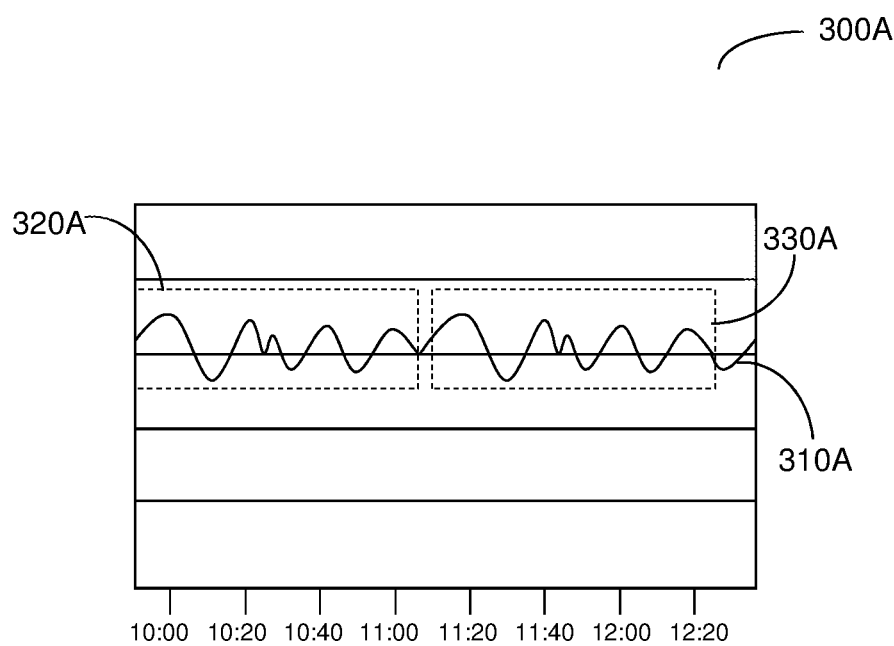
FIG. 3A simulates representation of a first pattern of normal sensory input behavior according to an embodiment.

FIG. 3A is an example representation of behavioral patterns implemented according to an embodiment. The representation shown in FIG. 3A includes a graph 300A in which sensory input data are represented by a curve 310A. In the example simulation shown in FIG. 3, the curve 310A represents an aggregated behavior of the sensory input data over time. During operation of a machine (e.g., the machine 170, FIG. 1), the aggregated behavior represented by the curve 310A may be continuously monitored for repeated sequences such as repeated sequences 320A and 330A. Upon determination of, for example, the repeated sequence 320A, the repeated sequence 330A, or both, a model of a normal behavior pattern of the machine is generated.

It should be noted that continuous monitoring of two or more cycles of behavior may be useful for determining more accurate patterns. As monitoring and, consequently, learning, continue, the normal behavior model may be updated accordingly. The models of normal behavior patterns may be utilized to determine machine failure predictions. As a non-limiting example, if the sequence 320A preceded a machine failure or other suboptimal operation of a machine, then the determination of repeated sequence 330A may be predicted to precede a machine failure or the other suboptimal operation of a machine.

Figure 3B:
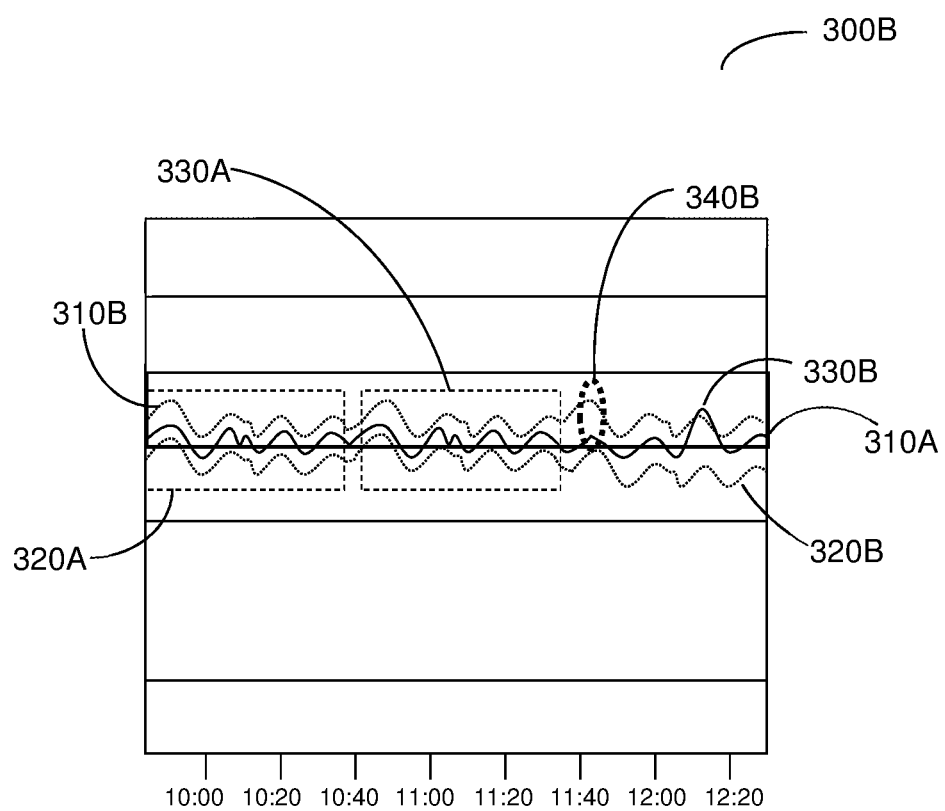
FIG. 3B simulates representation of a second pattern of an anomalous sensory input behavior according to an embodiment.

FIG. 3B is an example representation 300B illustrating generation of adaptive thresholds. Based on one or more repeated sequences (e.g., the repeated sequences 320A and 330A), a maximum threshold 310B and a minimum threshold 320B are determined. The thresholds 310B and 320B may be determined in real-time and regardless of past machine behavior. In an example implementation, the thresholds 310B and 320B are dynamic and adapted based on the sequences 320A and 330A as well as any subsequently determined sequences. The point 330B represents an indicator, i.e., a data point that is above the maximum threshold 310B or below the minimum threshold 320B. Upon determination that one of the thresholds 310B or 320B has been exceeded, an anomaly may be detected. In an embodiment, an anomaly is indicative of a suboptimal operation of the machine.

Figure 4:
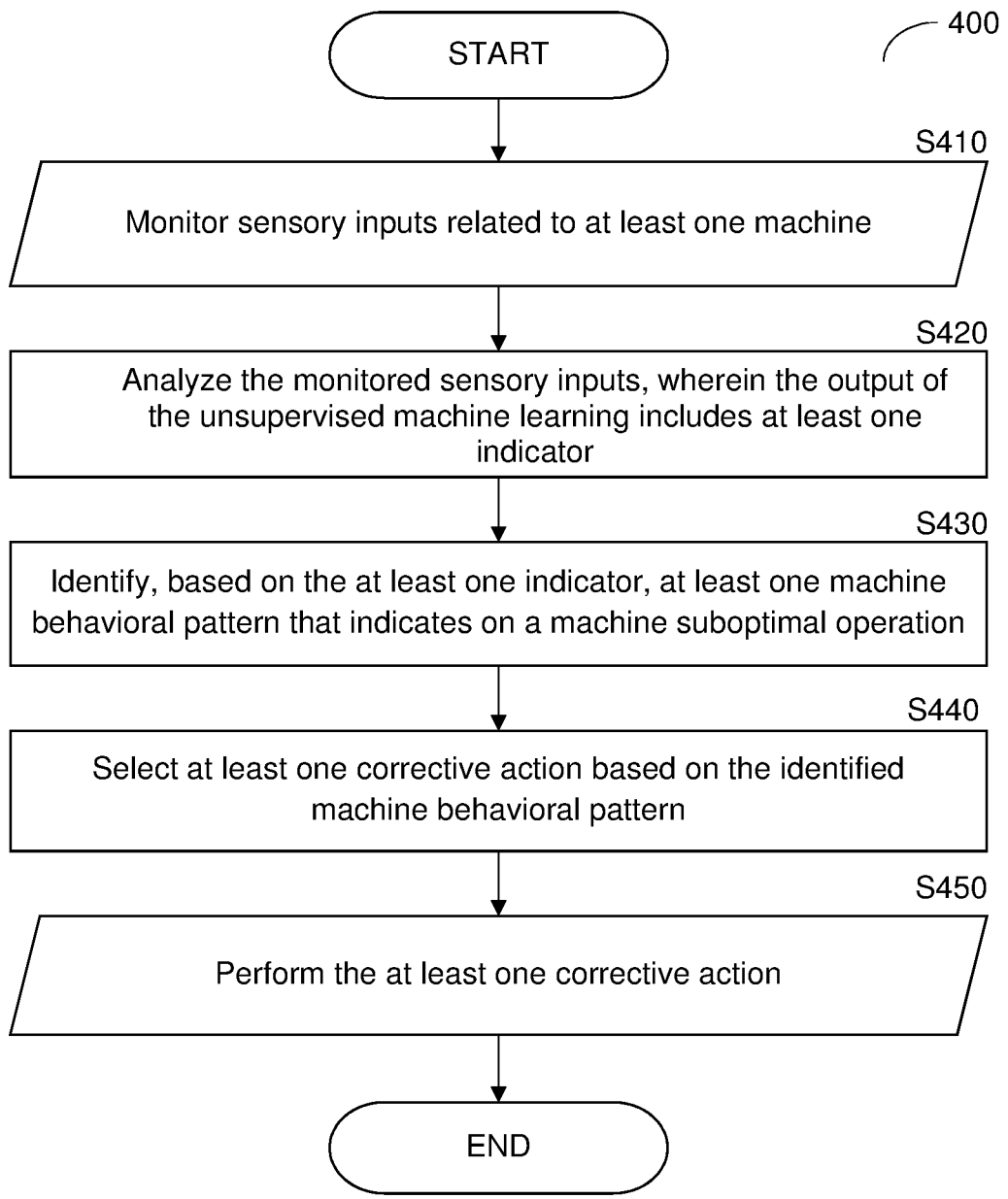
FIG. 4 is an example flowchart illustrating a method for identifying and proactively repairing a suboptimal operation of a machine according to an embodiment.

FIG. 4 is an example flowchart 400 illustrating a method for identifying and proactively repairing a suboptimal operation of a machine according to an embodiment.

At S410, sensory input data related to at least one machine, e.g., the machine 170 of FIG. 1, are monitored. The sensory input data may include for example sound signals, ultrasound signals, light, movement tracking indicators, temperature, energy consumption indicators, and the like based on operation of a machine, e.g., the machine 170.

At S420, the monitored sensory input data are analyzed, via at least unsupervised machine learning. It should be noted that different parameters represented by the sensory input data may be analyzed using different machine learning techniques. The output of the unsupervised machine learning may include at least one indicator. The indicators may be associated with various features of the machine such that, for example, abnormal temperature values of the machine may be recognized using temperature indicators, abnormal vibrations of the machine may be recognized using vibration indicators, and the like.

At S430, at least one machine behavioral pattern is identified based on the at least one indicator. The machine behavioral pattern may include one or more abnormal values associated with one or more components of the machine, one or more sequences of abnormal values, and the like. that are indicative of a suboptimal operation of a machine. In an embodiment, S430 may further include analyzing the identified pattern by, for example, comparing the identified pattern's characteristics to historical patterns' characteristics of machine behavioral historical patterns that were previously analyzed and stored in a database. The historical patterns' characteristics may be indicative of a machine failure root cause, a relevant corrective solution, and the like. Thus, the analysis of the identified pattern allows to determine the root cause of the machine behavioral pattern that indicates on the suboptimal operation of the machine. The root cause may be for example, an increasing temperature of one of the machine components, that may be solved by, for example, changing process conditions in the machine 170.

At S440, one or more corrective actions are selected based on the at least one machine behavioral pattern. The one or more corrective actions may include for example, tune the machine software parameters, i.e., configuration, change machine process conditions (temperature, humidity, and the like), inventory scheduling (order boiler/pump replacement a week before failure, and the like). In an embodiment, the selection of one or more corrective actions that are most likely to solve the machine failure may be achieved based on analyzing a plurality of corrective actions that are stored in a database and that were previously monitored. The analysis of the plurality of corrective actions may include ranking each corrective action with respect to its potential to contribute to repairing the machine failure. It should be noted that more than one corrective actions, determined to have a score that is above a predetermined level, may be selected by the management server 140. The selection of the corrective actions is further discussed with respect of FIG. 5.

At S450, the selected at least one corrective action is performed, i.e. executed, by the management server 140. In an embodiment, the management server 140 is configured to constantly monitor the influence of the corrective action on the machine behavior. The monitoring may be achieved by analyzing the sensory input data associated with the at least one machine, after the corrective action was performed, to determine the influence of the executed corrective action on the at least one machine behavior. According to another embodiment, the management server 140 may be configured to rank the at least one corrective action responsive of its effectiveness for repairing the suboptimal operation of the machine 170. The ranking may include, for example, associating a relatively high score for a corrective action that fully repaired the suboptimal operation, a medium score to solving only part of the suboptimal operation, and a low score for a relatively poor influence or a no influence at all on the suboptimal operation of the machine. According to another embodiment, the ranking may also include a negative score for corrective actions that were determined to aggravate the suboptimal operation.

According to another embodiment, the management server 140 may be configured to store in a data source, e.g., the data source 180, for future use, at least one of: the at least one machine behavioral pattern, the at least one corrective action, the ranking of the at least one corrective action. The future use may include, for example, ranking new corrective actions, suggest corrective actions, identify or recognize new abnormal machine behavioral patterns, and the like.

It should be noted that in case the management server 140 determines that the optimal or the only corrective solution must involve manual intervention, the management server 140 may generate a corrective solution recommendation indicating, e.g., the optimal way of action. According to another embodiment, the management server 140 may generate a corrective solution recommendation, and will not execute proactively a corrective action, even in case where the probability of damaging the machine 170 is above a predetermined threshold and no other better corrective actions are available. The recommendations may be sent by the management server 140 via the network 110 to a client device, e.g. the client device 160 that is associated with a person who is responsible for the machine 170 maintenance.

Figure 5:
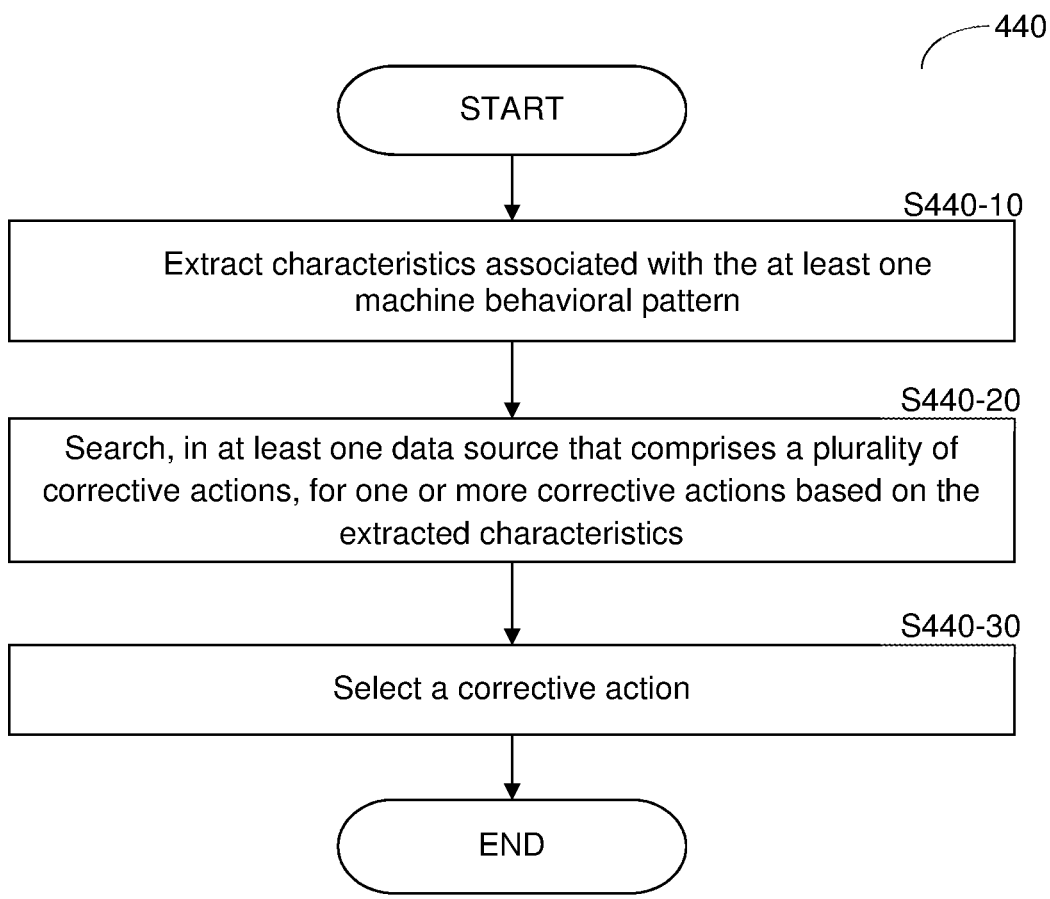
FIG. 5 is an example flowchart illustrating a method for selecting a corrective action for execution according to an embodiment.

FIG. 5 is an example flowchart 440 illustrating a method for selecting a corrective action for execution according to an embodiment. In an embodiment, the method may be performed by the management server 140.

At S440-10, one or more characteristics associated with the machine behavioral pattern, that is indicative of the at least one suboptimal operation of the machine, are extracted. The characteristics may be for example, the type of component(s) of the machine that are associated with the identified machine behavioral pattern, time pointer at which the pattern started, pattern duration, number of anomalies identified in a pattern that indicates on the suboptimal operation of the machine, and the like.

At S440-20, a search is performed, based on the extracted characteristics, in at least one data source, e.g., the data source 180, that includes a plurality of corrective actions, for one or more corrective actions. In an embodiment, the search may be performed by the management server 140. Each corrective action may include metadata indicating on for example, previous cases at which the corrective action managed to repair the suboptimal operation of the machine, the type of the suboptimal operation that was previously solved using the corrective action, corrective action description, and the like.

At S440-30, at least one corrective action having a first probability score that is above a first predetermined threshold to repair the at least one suboptimal operation of the machine, and a second probability score that is below a second predetermined threshold to damage the machine, is selected. The first threshold may state that a score of 70% for repairing the suboptimal operation of the machine is the minimum score a corrective action shall have in order to be a candidate corrective action. The second threshold may state that a score of 20% for damaging the machine is the maximum score a corrective action shall have in order to be a candidate corrective action. For example, a first optional corrective action having a first probability score of 97% for repairing the machine failure with a second probability score, i.e., risk, of 50% to cause a damage to the machine, is identified. According to the same example, a second optional corrective action having a first probability score of only 85% for repairing the suboptimal operation of the machine and a second probability score of 10% to damage the machine, may be selected over the first corrective action although the first probability score of the first corrective action to repair the machine failure is higher.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing circuitries ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for repairing suboptimal operation of an industrial machine, comprising:
   monitoring sensory input data related to an industrial machine;
   analyzing, using an unsupervised machine learning model, the monitored sensory inputs, wherein the output of the unsupervised machine learning model includes at least one indicator;
   identifying, based on the at least one indicator, at least one behavioral pattern related to the industrial machine, wherein each of the at least one behavioral pattern is indicative of at least one suboptimal operation of the industrial machine;
   selecting at least one corrective action based on the at least one behavioral pattern, wherein selecting at least one corrective action further comprises: extracting one or more characteristics associated with the at least one machine behavioral pattern that is indicative of the at least one suboptimal operation of the at least one machine;
   searching in at least one data source that comprises a plurality of corrective actions for one or more corrective actions based on extracted characteristics; and, selecting at least one corrective action having a first probability score that is above a first predetermined threshold to repair the at least one suboptimal operation of the machine, and a second probability score that is below a second predetermined threshold to damage the machine; and
   performing the at least one corrective action on the industrial machine.

2. The computer-implemented method of claim 1, further comprising:
   monitoring the sensory input data associated with the industrial machine to determine an influence of the corrective action on the at least one machine.

3. The computer-implemented method of claim 2, further comprising:
   ranking the at least one corrective action responsive of its effectiveness.

4. The computer-implemented method of claim 3, further comprising:
   storing in a data source at least one of: the at least one behavioral pattern, the at least one corrective action, and the ranking of the at least one corrective action.

5. The computer-implemented method of claim 1, further comprising:
   predicting, based on the at least one behavioral pattern and the monitored sensory input data, a failure of the industrial machine; and
   selecting at least one corrective action based on the industrial machine failure prediction.

6. The computer-implemented method of claim 1, further comprising:
   preprocessing raw sensory input data received from the sensors; and storing the preprocessed raw sensory input data in a data source.

7. The computer-implemented method of claim 6, wherein the preprocessing includes at least one of: data cleansing, normalization, rescaling, re-trending, reformatting, and noise filtering.

8. The computer-implemented method of claim 1, further comprising:
determining normal machine behavioral patterns based on the sensory input data of the machine; and
identifying, based on the normal machine behavioral patterns, at least one machine behavioral pattern that is indicative of the at least a suboptimal operation of the machine.

9. The computer-implemented method of claim 1, further comprising:
determining a maximum threshold and a minimum threshold based on at least one repeated sequence from sensory input data; and
detecting an anomaly indicative of the at least one suboptimal operation of the machine based on the determined maximum and minimum thresholds.

10. A non-transitory computer readable medium having stored thereon instructions for causing a processing circuitry to perform a process, the process comprising:
monitoring sensory input data related to a machine;
analyzing, using unsupervised machine learning, the monitored sensory inputs, wherein the output of the unsupervised machine learning includes at least one indicator;
identifying, based on the at least one indicator, at least one machine behavioral pattern that is indicative of at least one suboptimal operation of the machine;
selecting at least one corrective action based on the at least one machine behavioral pattern, wherein the system is further configured to: extract one or more characteristics associated with the at least one machine behavioral pattern that is indicative of the at least one suboptimal operation of the at least one machine; search in at least one data source that comprises a plurality of corrective actions for one or more corrective actions based on extracted characteristics; and, select at least one corrective action having a first probability score that is above a first predetermined threshold to repair the at least one suboptimal operation of the machine, and a second probability score that is below a second predetermined threshold to damage the machine; and,
performing the at least one corrective action on the machine.

11. A system for identifying and repairing suboptimal operation of a machine, comprising:
a processing circuitry; and
a memory, the memory containing instructions that, when executed by the processing circuitry, configure the system to:
monitor sensory input data related to an industrial machine;
analyze, using an unsupervised machine learning model, the monitored sensory inputs, wherein the output of the unsupervised machine learning model includes at least one indicator;
identify, based on the at least one indicator, at least one behavioral pattern related to the industrial machine, wherein each of the at least one behavioral pattern is indicative of at least one suboptimal operation of the industrial machine;
select at least one corrective action based on the at least one behavioral pattern, wherein selecting at least one corrective action further comprises: extracting one or more characteristics associated with the at least one machine behavioral pattern that is indicative of the at least one suboptimal operation of the at least one machine; searching in at least one data source that comprises a plurality of corrective actions for one or more corrective actions based on extracted characteristics; and, selecting at least one corrective action having a first probability score that is above a first predetermined threshold to repair the at least one suboptimal operation of the machine, and a second probability score that is below a second predetermined threshold to damage the machine; and
perform the at least one corrective action on the industrial machine.

12. The system of claim 11, wherein the system is further configured to:
monitor the sensory input data associated with the industrial machine to determine an influence of the corrective action on the at least one machine.

13. The system of claim 12, wherein the system is further configured to:
rank the at least one corrective action responsive of its effectiveness.

14. The system of claim 13, wherein the system is further configured to:
store in a data source at least one of: the at least one behavioral pattern, the at least one corrective action, and the ranking of the at least one corrective action.

15. The system of claim 11, wherein the system is further configured to:
predict, based on the at least one behavioral pattern and the monitored sensory input data, a failure of the industrial machine; and
select at least one corrective action based on the industrial machine failure prediction.

16. The system of claim 11, wherein the system is further configured to:
preprocess raw sensory input data received from the sensors; and
store the preprocessed raw sensory input data in a data source.

17. The system of claim 16, wherein the preprocessing includes at least one of: data cleansing, normalization, rescaling, re-trending, reformatting, and noise filtering.

18. The system of claim 11, wherein the system is further configured to:
determine normal machine behavioral patterns based on the sensory input data of the machine; and
identify, based on the normal machine behavioral patterns, at least one machine behavioral pattern that is indicative of the at least a suboptimal operation of the machine.

19. The system of claim 11, wherein the system is further configured to:
determine a maximum threshold and a minimum threshold based on at least one repeated sequence from sensory input data; and
detect an anomaly indicative of the at least one suboptimal operation of the machine based on the determined maximum and minimum thresholds.

* * * * *